(12) United States Patent
Sato et al.

(10) Patent No.: US 10,944,479 B2
(45) Date of Patent: Mar. 9, 2021

(54) OPTICAL MODULE AND OPTICAL COMMUNICATION SYSTEM

(71) Applicant: Lumentum Japan, Inc., Kanagawa (JP)

(72) Inventors: Koki Sato, Kanagawa (JP); Masaaki Furukawa, Kanagawa (JP); Keiichi Murakami, Kanagawa (JP); Takuya Sato, Kanagawa (JP)

(73) Assignee: Lumentum Japan, Inc., Kanagawa (JP)

( * ) Notice: Subject to any disclaimer, the term of this patent is extended or adjusted under 35 U.S.C. 154(b) by 0 days.

(21) Appl. No.: 16/832,143

(22) Filed: Mar. 27, 2020

(65) Prior Publication Data

US 2020/0322059 A1 Oct. 8, 2020

(30) Foreign Application Priority Data

Apr. 5, 2019 (JP) .............................. JP2019-072875

(51) Int. Cl.
*H04B 10/572* (2013.01)
*H04B 10/69* (2013.01)
*H04B 10/25* (2013.01)
*H04J 14/02* (2006.01)

(52) U.S. Cl.
CPC ........... *H04B 10/572* (2013.01); *H04B 10/25* (2013.01); *H04B 10/69* (2013.01); *H04J 14/02* (2013.01)

(58) Field of Classification Search
CPC ...... H04B 10/572; H04B 10/25; H04B 10/69; H04J 14/02

USPC .......................................................... 398/79
See application file for complete search history.

(56) References Cited

U.S. PATENT DOCUMENTS

| 6,985,534 B1 * | 1/2006 | Meister ................. H04L 5/0007 375/260 |
| 2004/0132412 A1 * | 7/2004 | Plett ...................... H04B 10/572 455/69 |
| 2006/0291870 A1 * | 12/2006 | Wan ................. H04B 10/50572 398/183 |
| 2017/0155464 A1 * | 6/2017 | He ...................... H04J 14/0256 |

FOREIGN PATENT DOCUMENTS

| EP | 2985943 A1 * | 2/2016 | ......... H04J 14/0258 |
| JP | 2004-015328 A | 1/2004 | |
| WO | WO-2006008786 A1 * | 1/2006 | ............. H04J 14/02 |

* cited by examiner

*Primary Examiner* — Dalzid E Singh
(74) *Attorney, Agent, or Firm* — Harrity & Harrity, LLP

(57) ABSTRACT

An optical module includes a photoelectric converter configured to receive an optical signal having an intensity that changes at one of a first frequency or a second frequency that is higher than the first frequency, and convert the optical signal into a current signal corresponding to the intensity of the optical signal; a signal processor configured to acquire, when the optical signal has the intensity that changes at the first frequency, wavelength information set on a transmitting side based on a ratio between a plurality of signal intensities included in the current signal relating to the optical signal having the intensity that changes at the first frequency; and a decoder configured to generate, when the optical signal has the intensity that changes at the second frequency, communication data from the current signal relating to the optical signal having the intensity that changes at the second frequency.

20 Claims, 9 Drawing Sheets

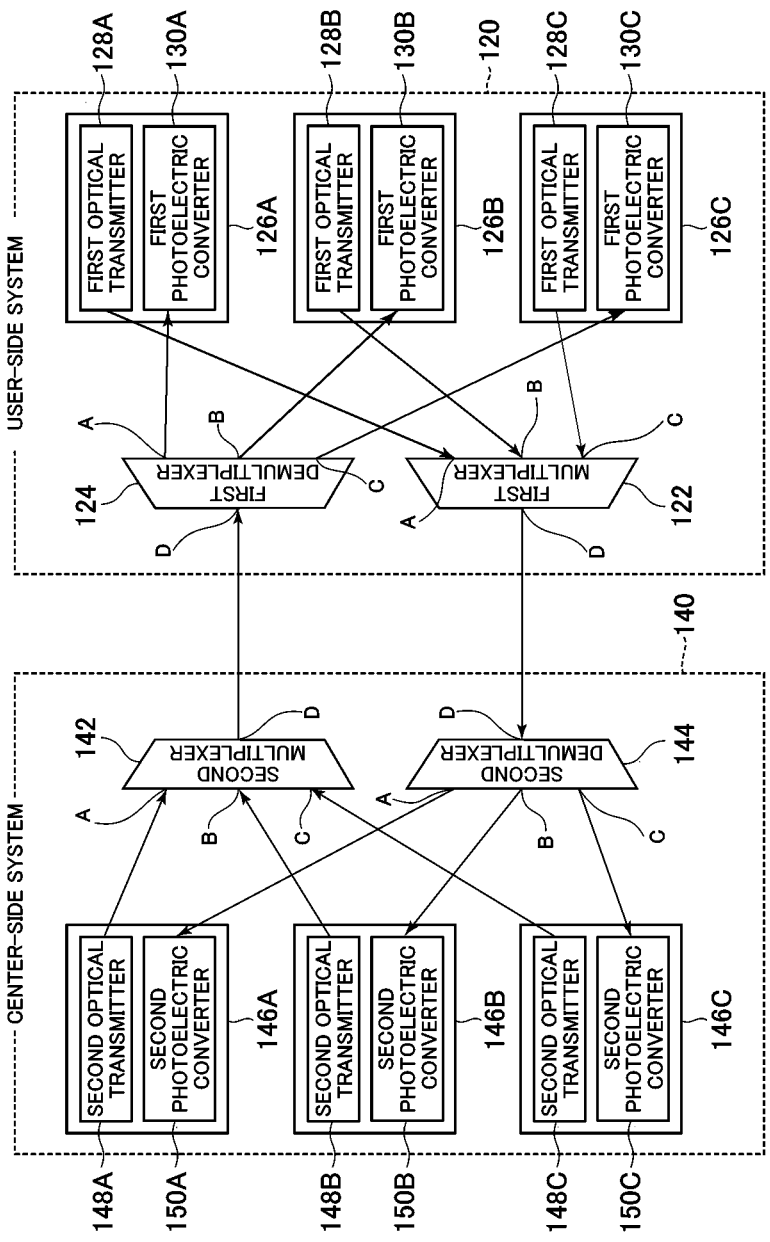

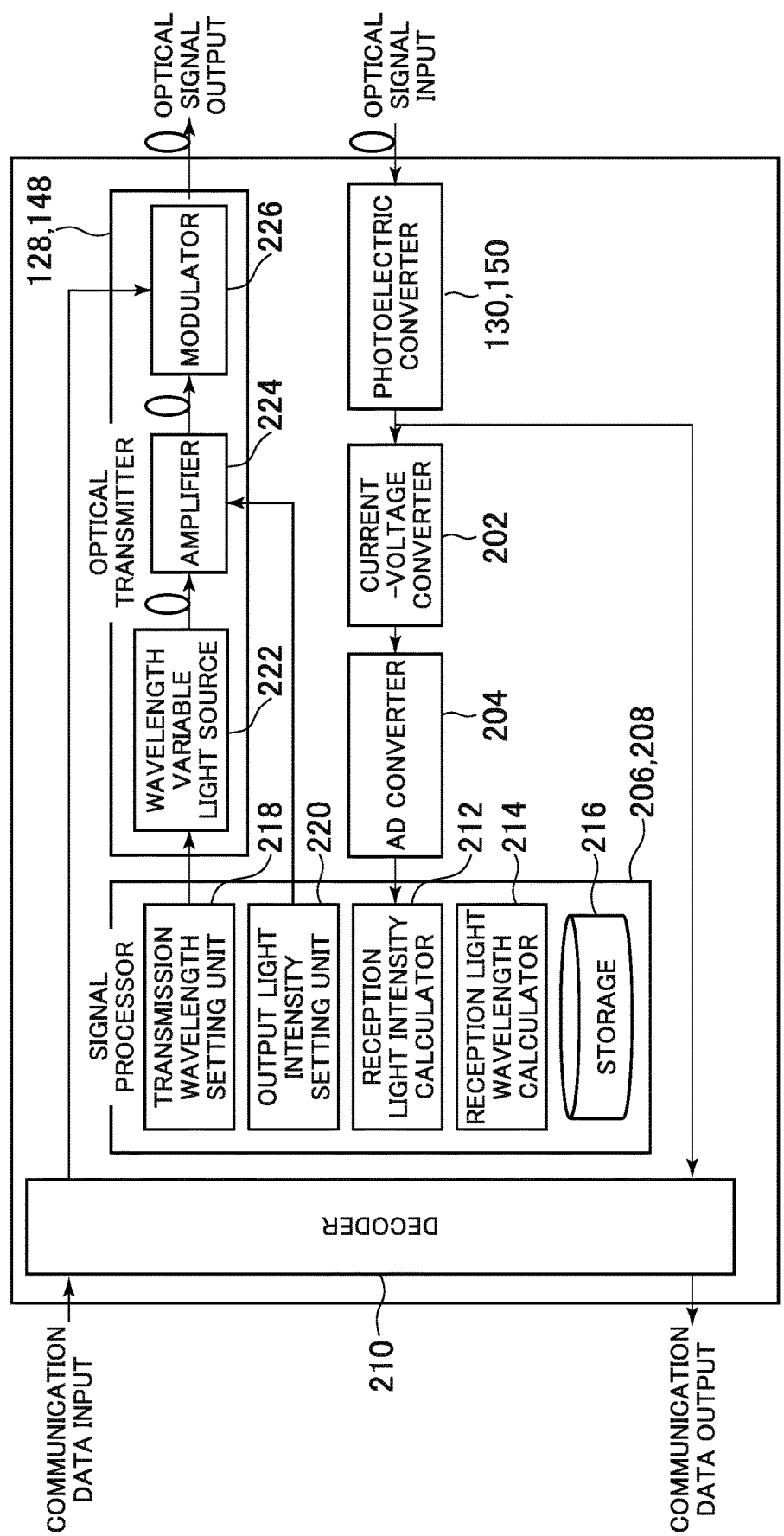

FIG.4

| RATIO | WAVELENGTH |
|---|---|
| 10% | $\lambda 1'$ |
| 20% | $\lambda 2'$ |
| ⋮ | ⋮ |
| 50% | $\lambda A'$ |
| ⋮ | ⋮ |
| N% | $\lambda N'$ |

FIG.9

| TRANSMISSION WAVELENGTH OF SECOND OPTICAL MODULE | TRANSMISSION WAVELENGTH OF FIRST OPTICAL MODULE |
|---|---|
| λ1 | λ1' |
| λ2 | λ2' |
| ⋮ | ⋮ |
| λA | λA' |
| ⋮ | ⋮ |
| λN | λN' |

OPTICAL MODULE AND OPTICAL COMMUNICATION SYSTEM

CROSS-REFERENCE TO RELATED APPLICATION

The present application claims priority from Japanese application JP2019-072875 filed on Apr. 5, 2019, which is hereby expressly incorporated by reference herein.

TECHNICAL FIELD

The present disclosure relates to an optical module and an optical communication system.

BACKGROUND

There has been constructed an optical communication system in which data communication is performed between an optical module on a transmitting side and an optical module on a receiving side through an optical fiber. Hitherto, for each wavelength to be used for communication, an optical module corresponding to the wavelength has been put to use. However, it is costly and inconvenient to provide an optical module corresponding to each wavelength.

In view of this, in recent years, there has been put to practical use an optical module capable of changing a wavelength of light to be transmitted by including a wavelength variable light source capable of changing the wavelength. When an optical module capable of changing a wavelength of light to be transmitted is used, a wavelength to be used is set in the optical module in advance.

When the wavelength to be used is to be set in the optical module in advance, a user is required to perform wavelength setting work and wavelength confirming work in advance. Such work requires a certain amount of time, which leads to poor convenience and high cost. There is also a concern that a wavelength different from the wavelength to be used for communication may be erroneously set when the user manually sets the wavelength. In this case, it is not possible to perform the communication, which causes a serious problem.

In view of the foregoing, a method may involve superimposing a signal pattern on an optical signal to set a given wavelength based on the signal pattern. A method may also involve superimposing a low-frequency signal different from a normal data signal on an optical signal through use of a wavelength variable light source to set a given wavelength based on the low-frequency signal.

An automatic wavelength setting method may use a wavelength division multiplexing (WDM) device. However, a function may need to be added to the WDM device in order to superimpose a signal pattern on an optical signal and to recognize the signal pattern, which can be costly.

In addition, when a low-frequency signal different from a normal data signal is used and the low-frequency signal is about 1 kHz, it is required to add a circuit for recognizing the low-frequency signal, which is costly. When the low frequency signal is about 10 Hz, it takes a long time to set a wavelength.

SUMMARY

According to some possible implementations, an optical module includes a photoelectric converter configured to receive an optical signal having an intensity that changes at one of a first frequency or a second frequency that is higher than the first frequency, and convert the optical signal into a current signal corresponding to the intensity of the optical signal; a signal processor configured to acquire, when the optical signal has the intensity that changes at the first frequency, wavelength information set on a transmitting side based on a ratio between a plurality of signal intensities included in the current signal relating to the optical signal having the intensity that changes at the first frequency; and a decoder configured to generate, when the optical signal has the intensity that changes at the second frequency, communication data from the current signal relating to the optical signal having the intensity that changes at the second frequency.

According to some possible implementations, an optical module includes a photoelectric converter configured to output a current signal corresponding to an intensity of a received optical signal; an optical transmitter configured to transmit an optical signal having an intensity that changes at one of a first frequency or a second frequency higher than the first frequency; and a signal processor configured to cause, under a state before the photoelectric converter receives the optical signal, the optical transmitter to transmit the optical signal including the wavelength information at the first frequency with a wavelength indicated by the wavelength information; cause, when the photoelectric converter receives an optical signal through a path that allows only an optical signal having a wavelength corresponding to the wavelength information to pass therethrough, the optical transmitter to stop transmitting the optical signal including the wavelength information; and transmit an optical signal having the wavelength indicated by the wavelength information and including communication data at the second frequency.

According to some possible implementations, an optical communication system includes a first optical module comprising a photoelectric converter configured to receive an optical signal having an intensity that changes at one of a first frequency or a second frequency higher than the first frequency and convert the optical signal into a current signal corresponding to the intensity of the optical signal; a first signal processor configured to acquire, when the optical signal has the intensity that changes at the first frequency, wavelength information set on a transmitting side based on a ratio between a plurality of signal intensities included in the current signal relating to the optical signal having the intensity that changes at the first frequency; and a first optical transmitter configured to transmit an optical signal having a wavelength corresponding to the wavelength information based on the wavelength information acquired by the first signal processor; and a second optical module comprising a second photoelectric converter configured to output a current signal indicating a change in intensity of a received optical signal; a second optical transmitter configured to transmit an optical signal having an intensity that changes at one of the first frequency and the second frequency; and a second signal processor configured to cause, under a state before the second photoelectric converter receives the optical signal, the second optical transmitter to transmit the optical signal including the wavelength information at the first frequency with a wavelength indicated by the wavelength information; and cause, when the second photoelectric converter receives an optical signal through a path that allows only an optical signal having a wavelength corresponding to the wavelength information to pass therethrough, the second optical transmitter to stop transmitting the optical signal including the wavelength information and transmit an optical signal having the wavelength indicated by the wavelength information and including communication data at the second frequency.

BRIEF DESCRIPTION OF THE DRAWINGS

FIG. 1 is a configuration example of an optical communication system according to an example.

FIG. 2 is a block diagram for illustrating a configuration of an optical module.

FIG. 4 is a table for showing a relationship between an intensity ratio and a wavelength.

FIG. 9 is a table for showing combinations of wavelengths of optical signals to be transmitted by the first optical module and the second optical module.

DETAILED DESCRIPTION

Figure 3A:
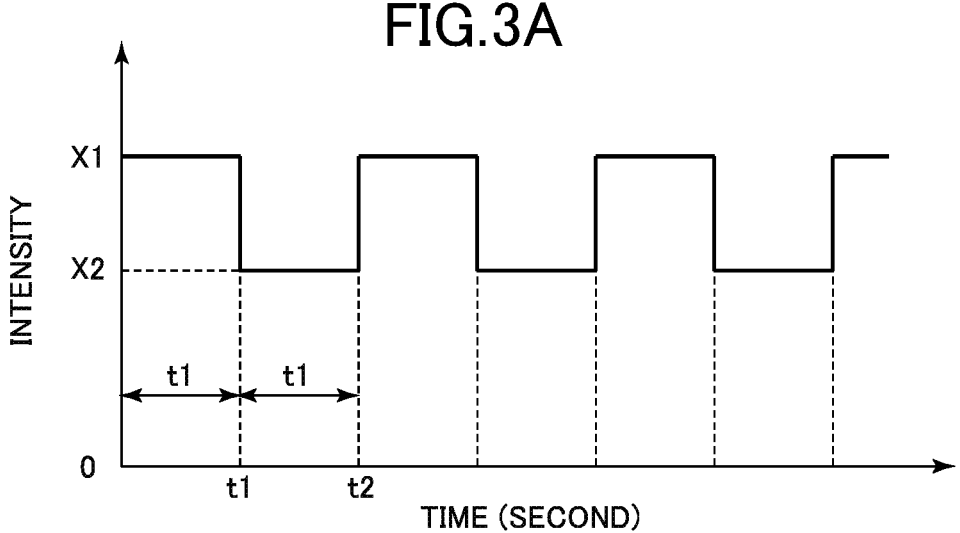
FIG. 3A, FIG. 3B, and FIG. 3C are graphs for showing examples of a voltage signal.

The following detailed description of example implementations refers to the accompanying drawings. The same reference numbers in different drawings may identify the same or similar elements.

FIG. 1 is a configuration example of an optical communication system 100. The optical communication system 100 includes a user-side system 120, a center-side system 140, and two communication paths for connecting the user-side system 120 and the center-side system 140 to each other. The user-side system 120 includes a first multiplexer 122, a first demultiplexer 124, first optical modules 126A, 126B, and 126C, and communication paths. The center-side system 140 includes a second multiplexer 142, a second demultiplexer 144, second optical modules 146A, 146B, and 146C, and communication paths. The user-side system 120 and the center-side system 140 are, for example, WDM systems.

The first demultiplexer 124 and the second demultiplexer 144 each include an input terminal to which an optical multiplex signal is to be input and a plurality of output terminals from which optical signals having mutually different wavelengths included in the optical multiplex signal are to be output. A wavelength that can pass through each output terminal is determined in advance. Specifically, the first demultiplexer 124 includes an output terminal A configured to allow light having a wavelength of λA to pass therethrough, an output terminal B configured to allow light having a wavelength of λB to pass therethrough, an output terminal C configured to allow light having a wavelength of λC to pass therethrough, and an input terminal D to which an optical multiplex signal is to be input. The second demultiplexer 144 includes an output terminal A configured to allow light having a wavelength of λA' to pass therethrough, an output terminal B configured to allow light having a wavelength of λB' to pass therethrough, an output terminal C configured to allow light having a wavelength of λC' to pass therethrough, and an input terminal D to which an optical multiplex signal is to be input.

The first multiplexer 122 and the second multiplexer 142 each include a plurality of input terminals to which optical signals having mutually different wavelengths are to be input and an output terminal from which an optical multiplex signal obtained by multiplexing a plurality of optical signals having mutually different wavelengths is to be output. A wavelength that can pass through each input terminal is determined in advance. Specifically, for example, the first multiplexer 122 transmits an input terminal A configured to allow light having the wavelength of λA' to pass therethrough, an input terminal B configured to allow light having the wavelength of λB' to pass therethrough, an input terminal C configured to allow light having a wavelength of λC' to pass therethrough, and an output terminal D from which an optical multiplex signal is to be output. The second multiplexer 142 includes an input terminal A configured to allow light having the wavelength of λA to pass therethrough, an input terminal B configured to allow light having the wavelength of λB to pass therethrough, an input terminal C configured to allow light having the wavelength of λC to pass therethrough, and an output terminal D from which an optical multiplex signal is to be output.

The first demultiplexer 124 and the second multiplexer 142 are connected by a communication path. Specifically, the output terminal D of the second multiplexer 142 and the input terminal D of the first demultiplexer 124 are connected by an optical fiber cable. The optical multiplex signal multiplexed by the second multiplexer 142 is transmitted to the first demultiplexer 124 through the optical fiber cable.

In the same manner, the first multiplexer 122 and the second demultiplexer 144 are connected by a communication path. Specifically, the output terminal D of the first multiplexer 122 and the input terminal D of the second demultiplexer 144 are connected by the optical fiber cable. The optical multiplex signal multiplexed by the first multiplexer 122 is transmitted to the second demultiplexer 144 through the optical fiber cable.

The first optical module 126 and the second optical module 146 each include an optical transmitter and a photoelectric converter. In the following description, when explicitly represented to be included in the first optical module 126, the optical transmitter and the photoelectric converter are referred to as "first optical transmitter 128" and "first photoelectric converter 130", respectively. Meanwhile, when explicitly represented to be included in the second optical module 146, the optical transmitter and the photoelectric converter are referred to as "second optical transmitter 148" and "second photoelectric converter 150", respectively. The other components included in the first optical module 126 and the second optical module 146 are described later.

The first optical transmitter 128 of the first optical module 126 is coupled to one of the plurality of input terminals included in the first multiplexer 122. Specifically, for example, a first optical transmitter 128A is connected to the input terminal A of the first multiplexer 122 through an optical fiber cable. A first optical transmitter 128B is connected to the input terminal B of the first multiplexer 122 through an optical fiber cable. A first optical transmitter 128C is connected to the input terminal C of the first multiplexer 122 through an optical fiber cable.

The first photoelectric converter 130 of the first optical module 126 is coupled to one of the plurality of output terminals included in the first demultiplexer 124. Specifically, a first photoelectric converter 130A is connected to the output terminal A of the first demultiplexer 124 through an optical fiber cable. A first photoelectric converter 130B is connected to the output terminal B of the first demultiplexer 124 through an optical fiber cable. A first photoelectric converter 130C is connected to the output terminal C of the first demultiplexer 124 through an optical fiber cable.

The second optical transmitter 148 of the second optical module 146 is coupled to one of the plurality of input terminals included in the second multiplexer 142. Specifically, for example, a second optical transmitter 148A is connected to the input terminal A of the second multiplexer 142 through an optical fiber cable. A second optical transmitter 148B is connected to the input terminal B of the second multiplexer 142 through an optical fiber cable. A second optical transmitter 148C is connected to the input terminal C of the second multiplexer 142 through an optical fiber cable.

The second photoelectric converter 150 of the second optical module 146 is coupled to one of the plurality of output terminals included in the second demultiplexer 144. Specifically, a second photoelectric converter 150A is connected to the output terminal A of the second demultiplexer 144 through an optical fiber cable. A second photoelectric converter 150B is connected to the output terminal B of the second demultiplexer 144 through an optical fiber cable. A second photoelectric converter 150C is connected to the output terminal C of the second demultiplexer 144 through an optical fiber cable.

Now, a description is given of a flow of an optical signal at the time when normal data communication is performed in the optical communication system 100 described above. In the following description, a state in which normal data communication is performed is referred to as "normal operation mode". Meanwhile, a state in which a wavelength to be used for transmission by the optical transmitter is being set without communication being established is referred to as "wavelength setting mode".

First, the second optical transmitters 148A, 148B, and 148C included in the second optical modules 146A, 146B, and 146C transmit optical signals having the wavelengths of $\lambda A$, $\lambda B$, and $\lambda C$, respectively. The optical signals having the wavelengths of $\lambda A$, $\lambda B$, and $\lambda C$ are input to the second multiplexer 142 through the optical fiber cables and through the input terminals A, B, and C of the second multiplexer 142. The optical signals having the wavelengths of $\lambda A$, $\lambda B$, and $\lambda C$ are multiplexed by the second multiplexer 142 to become an optical multiplex signal. The optical multiplex signal is input to the first demultiplexer 124 through the output terminal D of the second multiplexer 142, the optical fiber cable, and the input terminal D of the first demultiplexer 124. The optical multiplex signal is demultiplexed by the first demultiplexer 124 into optical signals having the wavelengths of $\lambda A$, $\lambda B$, and $\lambda C$.

The demultiplexed optical signal having the wavelength of $\lambda A$ is input to the first photoelectric converter 130A of the first optical module 126A through the output terminal A of the first demultiplexer 124 and the optical fiber cable. The demultiplexed optical signal having the wavelength of $\lambda B$ is input to the first photoelectric converter 130B of the first optical module 126B through the output terminal B of the first demultiplexer 124 and the optical fiber cable. The demultiplexed optical signal having the wavelength of $\lambda C$ is input to the first photoelectric converter 130C of the first optical module 126C through the output terminal C of the first demultiplexer 124 and the optical fiber cable.

In the same manner, the first optical transmitters 128A, 128B, and 128C included in the first optical modules 126A, 126B, and 126C transmit optical signals having the wavelengths of $\lambda A'$, $\lambda B'$, and $\lambda C'$, respectively. The optical signals having the wavelengths of $\lambda A'$, $\lambda B'$, and $\lambda C'$ are input to the first multiplexer 122 through the optical fiber cables and through the input terminals A, B, and C of the first multiplexer 122. The optical signals having the wavelengths of $\lambda A'$, $\lambda B'$, and $\lambda C'$ are multiplexed by the first multiplexer 122 to become an optical multiplex signal. The optical multiplex signal is input to the second demultiplexer 144 through the output terminal D of the first multiplexer 122, the optical fiber cable, and the input terminal D of the second demultiplexer 144. The optical multiplex signal is demultiplexed by the second demultiplexer 144 into optical signals having the wavelengths of $\lambda A'$, $\lambda B'$, and $\lambda C'$.

The demultiplexed optical signal having the wavelength of $\lambda A'$ is input to the second photoelectric converter 150A of the second optical module 146A through the output terminal A of the second demultiplexer 144 and the optical fiber cable. The demultiplexed optical signal having the wavelength of $\lambda B'$ is input to the second photoelectric converter 150B of the second optical module 146B through the output terminal B of the second demultiplexer 144 and the optical fiber cable. The demultiplexed optical signal having the wavelength of $\lambda C'$ is input to the second photoelectric converter 150C of the second optical module 146C through the output terminal C of the second demultiplexer 144 and the optical fiber cable.

As described above, the optical signal having each wavelength passes through each input terminal or output terminal configured to allow the wavelength to pass therethrough, and is subjected to multiplexing or demultiplexing, to thereby be transmitted or received between the user-side system 120 and the center-side system 140. In this manner, data communication is performed through optical communication.

FIG. 2 is a block diagram for illustrating the configuration of the first optical module 126 and the second optical module 146 according to at least one implementation. The first optical module 126 includes the photoelectric converter 130, a current-voltage converter 202, an AD converter 204, a signal processor 206, the optical transmitter 128, and a decoder 210. The second optical module 146 includes the photoelectric converter 150, a current-voltage converter 202, an AD converter 204, a signal processor 208, the optical transmitter 148, and a decoder 210. In the following description, when explicitly represented to be included in the first optical module 126, each of the components is referred to with the addition of "first". In the same manner, when explicitly represented to be included in the second optical module 146, each of the components is referred to with the addition of "second".

The photoelectric converters 130 and 150 each receive an optical signal whose intensity changes at a first frequency or a second frequency higher than the first frequency, and convert the optical signal into a current signal corresponding to the intensity of the optical signal. Specifically, for example, the photoelectric converters 130 and 150 each include a light receiving element such as a photodiode. The photoelectric converters 130 and 150 each output a current corresponding to the intensity of an optical signal input through an optical fiber cable. Under a state before data communication is started (that is, in the wavelength setting mode), the photoelectric converters 130 and 150 each receive an optical signal whose intensity changes at the first frequency. Meanwhile, during data communication (that is, in the normal operation mode), the photoelectric converters 130 and 150 each receive an optical signal whose intensity changes at the second frequency higher than the first frequency. In this case, the first frequency is, for example, from 1 Hz to 250 Hz. The second frequency is, for example, 1 GHz or higher.

The current signal converted from the optical signal by each of the photoelectric converters 130 and 150 is transmitted to two lines. One of the lines is a line connected to the current-voltage converter 202, and the other is a line connected to the decoder 210. In the normal operation mode, an optical signal having the second frequency for communication is input to each of the photoelectric converters 130 and 150 to be converted into a current signal for communication. The current signal for communication is recognized as a signal by the decoder 210, and thus communication is performed. At this time, the same current signal for communication is simultaneously input to the current-voltage converter 202 side as well. This current signal is transmitted to the AD converter 204 and a reception light intensity calculator 212. The reception light intensity calculator 212 calculates an average voltage of a voltage signal converted into a voltage by the AD converter 204, and calculates an average light intensity of the input optical signal. The calculated average light intensity can be read from, for example, a host device side, and is used for monitoring a communication state or another such purpose. Meanwhile, in the wavelength setting mode, the optical signal having the first frequency is input to each of the photoelectric converters 130 and 150 to be converted into a current signal. This current signal is also transmitted to the AD converter 204 and the decoder 210. At this time, the decoder 210 is not set in the normal operation mode, and therefore avoids recognizing the input current signal as a current signal for communication and ignores this current signal. Meanwhile, a wavelength is set in each of the signal processors 206 and 208 based on the current signal input to the AD converter 204 through a procedure described later.

The current-voltage converter 202 converts a current signal into a voltage signal. Specifically, for example, the current-voltage converter 202 is an I-V converter, and converts the current signal output from each of the photoelectric converters 130 and 150 into a voltage signal having a magnitude corresponding to a magnitude of the current signal.

The AD converter 204 converts an analog signal into a digital signal. Specifically, for example, the AD converter 204 acquires a voltage signal being an analog signal output by the current-voltage converter 202. Then, the AD converter 204 converts the acquired voltage signal into a voltage signal being a digital signal so that the voltage signal can be recognized by each of the signal processors 206 and 208 and the decoder 210.

The signal processors 206 and 208 each include the reception light intensity calculator 212, a reception light wavelength calculator 214, a storage 216, a transmission wavelength setting unit 218, and an output light intensity setting unit 220. Each of the signal processors 206 and 208 is, for example, a microcomputer.

In the wavelength setting mode, the reception light intensity calculator 212 and the reception light wavelength calculator 214 acquire wavelength information set on a transmitting side based on a ratio between a plurality of signal intensities included in the current signal relating to the optical signal whose intensity changes at the first frequency.

Specifically, for example, when receiving the optical signal whose intensity changes at the first frequency, the photoelectric converters 130 and 150 each output a current signal whose intensity changes at the first frequency. The output current signal is converted into a voltage signal being a digital signal through the current-voltage converter 202 and the AD converter 204. This signal is a signal which includes at least binary voltage values and whose intensity changes at the first frequency. In addition, the voltage value of the voltage signal corresponds to the signal intensity of the received optical signal.

The reception light intensity calculator 212 calculates the ratio between the signal intensities. Specifically, for example, the reception light intensity calculator 212 first samples the voltage signal for a predetermined period. The predetermined period is a period during which data corresponding to one cycle of the optical signal whose intensity changes at the first frequency is sampled a plurality of times.

Then, the reception light intensity calculator 212 calculates the ratio between the voltage values included in the voltage signal acquired in one sampling. For example, the signal intensities corresponding to at least binary voltage values included in the voltage signal are set at intervals of 2 dBm, and each take any one of values ranging from −2 dBm to −20 dBm. When the binary voltage values correspond to −20 dBm and −10 dBm, the reception light intensity calculator 212 acquires a ratio of 50% through calculation.

Meanwhile, in the normal operation mode, the reception light intensity calculator 212 calculates an average intensity of the optical signal. Specifically, for example, in the normal operation mode, a high-frequency optical signal whose intensity changes at the second frequency is input to each of the photoelectric converters 130 and 150. In this case, the reception light intensity calculator 212 outputs the average intensity of a high-frequency voltage signal output from the AD converter 204. The average intensity is used, for example, to monitor the states of the first optical module 126 and the second optical module 146.

FIG. 3A is a graph for showing an example of the voltage signal. As shown in FIG. 3A, the voltage signal includes binary voltage values of X1 and X2. The reception light intensity calculator 212 calculates a ratio between the binary voltage values of X1 and X2. In the example of FIG. 3A, X1 is a voltage value corresponding to −10 dBm, and X2 is a voltage value corresponding to −20 dBm. Therefore, the reception light intensity calculator 212 acquires a value of 50% through calculation.

The reception light wavelength calculator 214 calculates a wavelength based on the ratio calculated by the reception light intensity calculator 212. Specifically, the reception light wavelength calculator 214 refers to a table stored in the storage 216 to calculate a wavelength corresponding to the ratio.

The storage 216 stores the ratio between the plurality of signal intensities included in the current signal relating to the optical signal whose intensity changes at the first frequency and the wavelength information in association with each other. Specifically, for example, the storage 216 stores such a table as shown in FIG. 4. The reception light wavelength calculator 214 refers to the table shown in FIG. 4 to calculate the wavelength λA' corresponding to the ratio of 50%. The first signal processor 206 thus acquires the wavelength information set on the transmitting side based on the optical signal whose intensity changes at the first frequency.

Figure 3B:
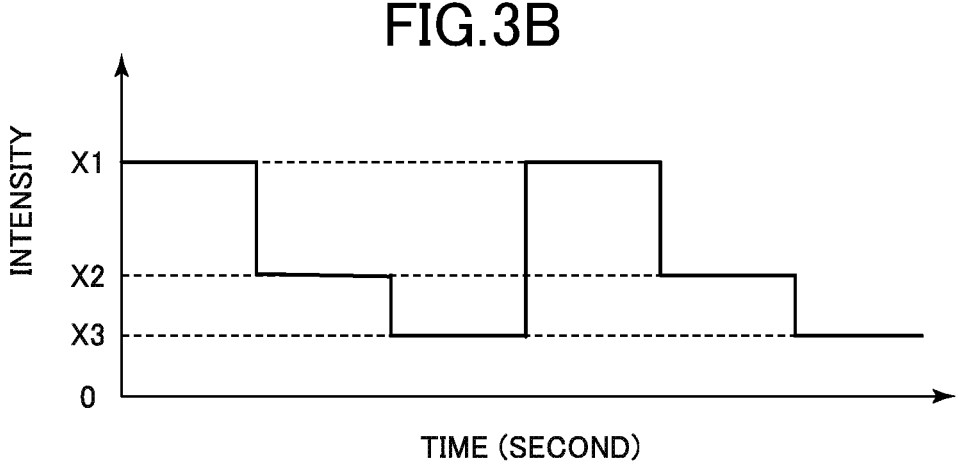
Figure 3C:
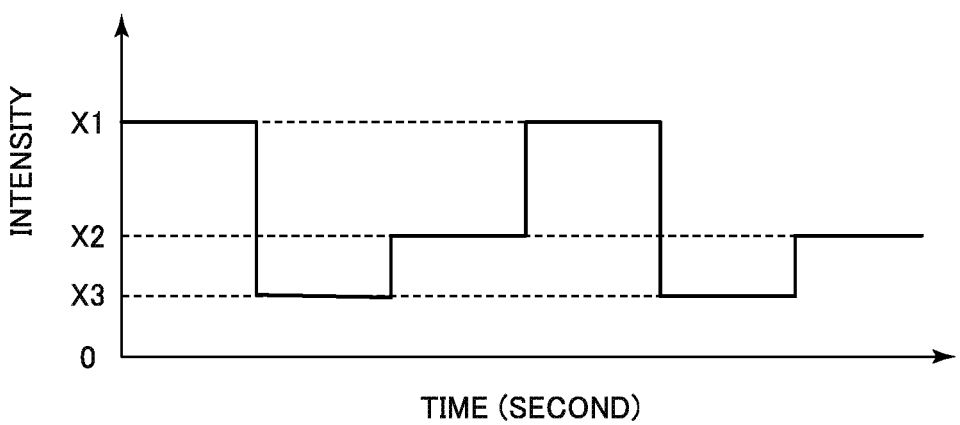

The plurality of signal intensities included in the current signal relating to the optical signal whose intensity changes at the first frequency may have ternary values. For example, FIG. 3B and FIG. 3C are graphs for showing other examples of the voltage signal. As shown in FIG. 3B and FIG. 3C, the voltage signal includes ternary voltage values of X1, X2, and X3. In this case, the storage 216 stores a ratio between X1 and X2, a ratio between X1 and X3, and the wavelength information in association with one another.

For example, as shown in FIG. 3B, when X1 is −4 dBm, X2 is −10 dBm, and X3 is −20 dBm, the reception light intensity calculator 212 acquires a ratio of 50% and a ratio of 20% through calculation. Then, the reception light wavelength calculator 214 refers to the table stored in the storage 216 to calculate wavelength information associated with a case in which the ratio between X1 and X2 is 50% and the ratio between X1 and X3 is 20%.

Meanwhile, for example, as shown in FIG. 3C, when X1 is −4 dBm, X2 is −10 dBm, and X3 is −20 dBm, the reception light intensity calculator 212 acquires a ratio of 20% and a ratio of 50% through calculation. Then, the reception light wavelength calculator 214 refers to the table stored in the storage 216 to calculate wavelength information associated with a case in which the ratio between X1 and X2 is 20% and the ratio between X1 and X3 is 50%.

The wavelength information may be set irrespective of an order in which the voltage values of X2 and X3 appear. For example, FIG. 3B and FIG. 3C are different in the order in which the voltage value of X2 and the voltage value of X3 appear, but are the same in that three voltage values included in the voltage signal are X1, X2, and X3. Therefore, the reception light intensity calculator 212 may calculate a ratio between the largest voltage value and the second largest voltage value and a ratio between the largest voltage value and the third largest voltage value. In the above-mentioned case, the reception light intensity calculator 212 acquires the ratio of 50% and the ratio of 20% through calculation. The reception light wavelength calculator 214 may refer to the table stored in the storage 216 to calculate wavelength information associated with a case in which the ratio between the largest voltage value and the second largest voltage value is 50% and the ratio between the largest voltage value and the third largest voltage value is 20%.

In WDM communication systems, wavelengths to be used are defined, but the number of wavelengths to be used differs depending on the system to be actually operated. When the number of wavelengths is small, for example, 30 Ch or less, a signal intensity interval for each wavelength can be set to 1 dBm, and a difference in intensity ratio can be sufficiently recognized. However, when, for example, a larger number of wavelengths is required, the signal intensity interval becomes smaller, which leads to a fear that recognition of the wavelength may fail due to an influence of, for example, intensity fluctuations exhibited during communication. In such a case, the wavelength can be reliably set by employing a method using such ternary values as shown in FIG. 3B and FIG. 3C.

Here, an internal clock frequency of each of the signal processors 206 and 208 is generally higher than the first frequency and lower than the second frequency. Specifically, for example, the internal clock frequency is 100 kHz. Therefore, when an optical signal whose intensity changes at the second frequency is received in the normal operation mode, it is difficult for each of the signal processors 206 and 208 to generate communication data from the current signal relating to the optical signal, and therefore acquires the average intensity of the optical signal. Meanwhile, when an optical signal whose intensity changes at the first frequency is received, strict synchronization is not required. This allows each of the signal processors 206 and 208 to detect a voltage value in the wavelength setting mode. Therefore, even under a state in the wavelength setting mode in which communication has not been established, each of the signal processors 206 and 208 can acquire wavelength information based on the optical signal whose intensity changes at the first frequency.

The transmission wavelength setting unit 218 controls a wavelength variable light source 222 in terms of the wavelength of light to be output. Specifically, for example, the transmission wavelength setting unit 218 controls the wavelength variable light source 222 to output light having a wavelength calculated by the reception light wavelength calculator 214.

The output light intensity setting unit 220 controls the operation of an amplifier 224 so that the intensity changes at the first frequency when each of the photoelectric converters 130 and 150 is receiving no optical signal. Specifically, for example, the output light intensity setting unit 220 controls the gain of the amplifier 224 to change at the first frequency in the wavelength setting mode. The output light intensity setting unit 220 also controls the gain of the amplifier 224 to change in accordance with the above-mentioned ratio. In the above-mentioned example, the output light intensity setting unit 220 controls the amplifier 224 so that the ratio between X1 and X2 being an intensity after amplification becomes 50%. Through this control, under a state before each of the photoelectric converters 130 and 150 receives an optical signal, the output light intensity setting unit 220 causes, based on the wavelength information acquired by each of the signal processors 206 and 208, each of the optical transmitters 128 and 148 to transmit an optical signal having a wavelength corresponding to the wavelength information. In the wavelength setting mode, it is desired to set an output intensity of the wavelength variable light source 222 at a constant value and set a modulator 226 unmodulated. However, any modulation information that does not affect recognition of the light intensity ratio may be superimposed.

The optical transmitters 128 and 148 each transmit an optical signal whose intensity changes at the first frequency or the second frequency higher than the first frequency. In addition, the optical transmitters 128 and 148 each transmit an optical signal having a wavelength indicated by the wavelength information based on the wavelength information acquired by each of the signal processors 206 and 208. The optical transmitters 128 and 148 each include the wavelength variable light source 222, the amplifier 224, and the modulator 226.

The wavelength variable light source 222 is, for example, a wavelength variable laser. The wavelength variable light source 222 outputs light having a freely-set wavelength specified under the control of the transmission wavelength setting unit 218.

The amplifier 224 amplifies the light output from the wavelength variable light source 222. The amplifier 224 is, for example, a semiconductor optical amplifier (SOA). The amplifier 224 amplifies the light output from the wavelength variable light source 222 as described above under the control of the output light intensity setting unit 220.

The modulator 226 converts the light output from the amplifier 224 into a modulated signal. The modulator 226 is, for example, an MZ modulator or an EA modulator. The modulator 226 converts continuous light output from the amplifier 224 into an optical signal modulated to the second frequency based on the communication data input, and outputs the optical signal to an external optical fiber cable.

The decoder 210 generates communication data from the current signal relating to the optical signal whose intensity changes at the second frequency. Specifically, for example, the decoder 210 has a clock data recovery (CDR) function of receiving a voltage signal in which a clock is superimposed on data and separating the communication data from the clock. The decoder 210 stops operating until wavelength information is acquired based on the optical signal whose intensity changes at the first frequency (that is, in the wavelength setting mode). Meanwhile, when wavelength information is acquired based on the optical signal whose intensity changes at the first frequency and the mode shifts to the normal operation mode, the decoder 210 starts to generate communication data from the current signal. The decoding from the current signal is performed by, for example, an AD converter or a CDR function built in the decoder 210.

The decoder 210 may be omitted. Alternatively, the decoder 210 connected to each of the photoelectric converters 130 and 150 and the decoder 210 connected to each of the optical transmitters 128 and 148 may be separately provided.

Figure 5:
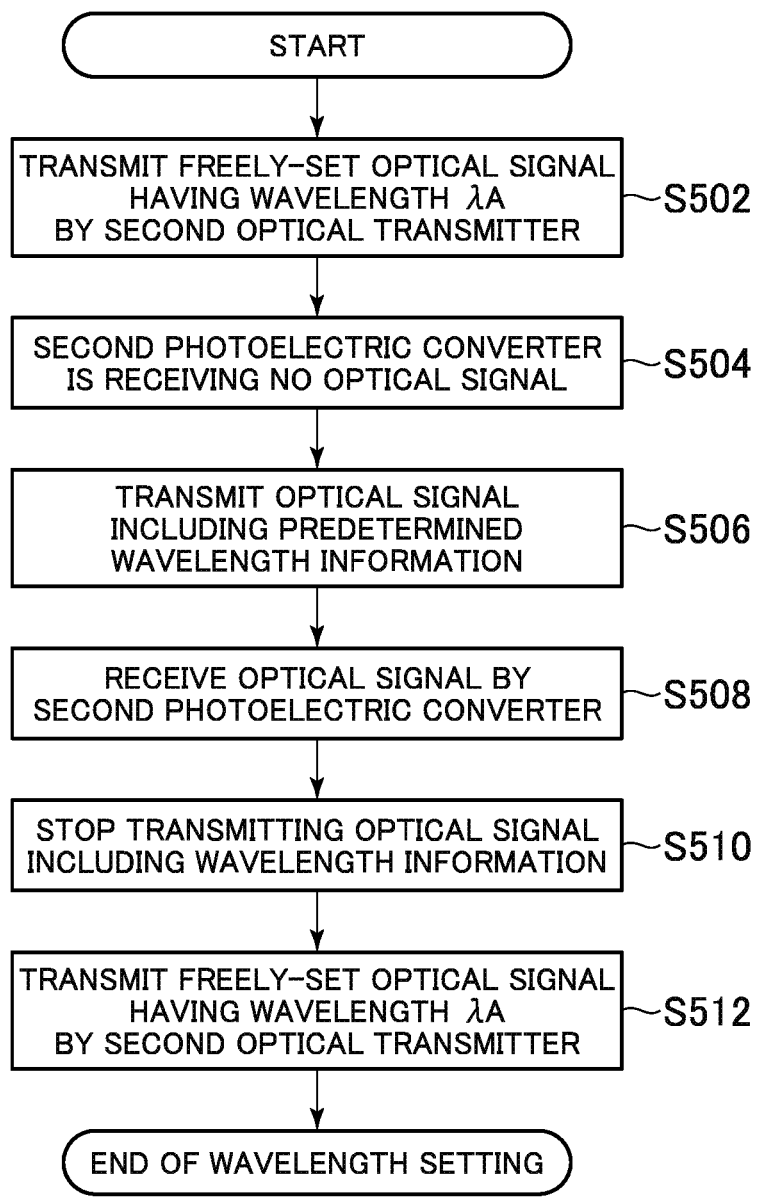
FIG. 5 is an example of a flow chart for illustrating an operation performed by a second optical module.
Figure 6:
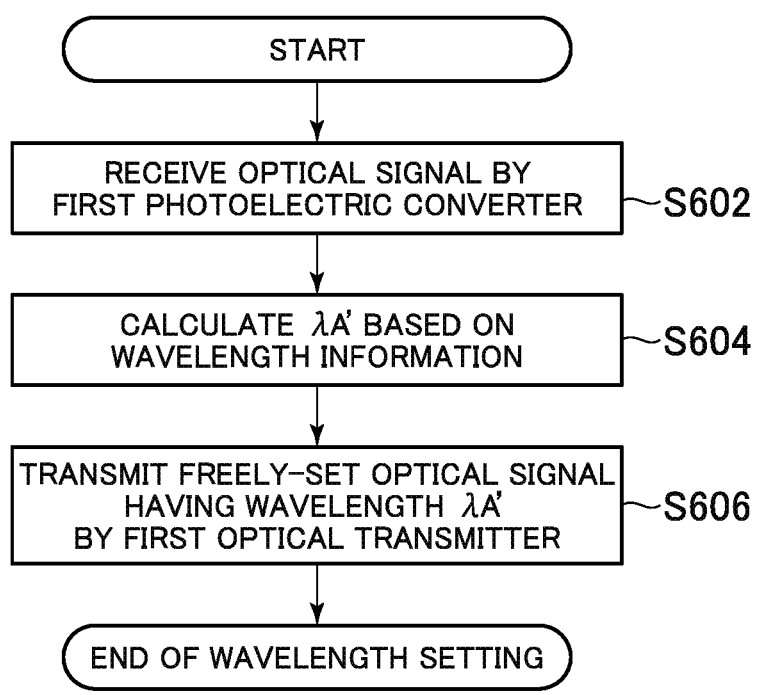
FIG. 6 is an example of a flow chart for illustrating an operation performed by a first optical module.

Next, a description is given of a flow for setting the wavelength of the optical signal output from the first optical transmitter 128A of the first optical module 126A to $\lambda A'$. FIG. 5 is a flow chart for illustrating an operation performed by the second optical module 146A. FIG. 6 is a flow chart for illustrating an operation performed by the first optical module 126A.

As an initial state, the second optical module 146A connected to the input terminal A of the second multiplexer 142 is ready to transmit an optical signal having the wavelength $\lambda A$ that can pass through the input terminal A. This initial state is also a state (in the wavelength setting mode) before data communication by the optical signal whose intensity changes at the second frequency is started.

First, the transmission wavelength setting unit 218 of the second optical module 146A sets the wavelength of light to be output from the wavelength variable light source 222 of the second optical module 146A to $\lambda A$. Then, the second optical transmitter 148A of the second optical module 146A outputs an optical signal having the wavelength $\lambda A$ (Step S502). In this case, the intensity of the light output from the wavelength variable light source 222 of the second optical module 146A is constant.

Next, communication is not established in the initial state between the first optical module 126A and the second optical module 146A although the second photoelectric converter 150A receives the optical signal when communication is established therebetween. Therefore, the second photoelectric converter 150A does not receive the optical signal (Step S504).

Subsequently, the second signal processor 208 of the second optical module 146A controls the output light intensity setting unit 220 so that the optical signal to be transmitted indicates desired wavelength information (Step S506). In this case, the desired wavelength is $\lambda A'$ being the wavelength to be used for transmission by the first optical transmitter 128A of the first optical module 126A. Thus, the second optical transmitter 148A of the second optical module 146A transmits, for example, the optical signal shown in FIG. 3A. The transmitted optical signal is input to the input terminal A of the second multiplexer 142 through the optical fiber cable. The input optical signal is multiplexed by the second multiplexer 142 to become an optical multiplex signal, and is then output from the output terminal D of the second multiplexer 142.

The optical multiplex signal is input to the first demultiplexer 124 through the optical fiber cable and through the input terminal D of the first demultiplexer 124. The optical multiplex signal is demultiplexed by the first demultiplexer 124, and the optical signal having the wavelength $\lambda A$ is acquired through the demultiplexing. Then, the optical signal having the wavelength $\lambda A$, which has been acquired through the demultiplexing, is input to the first photoelectric converter 130A of the first optical module 126A through the output terminal A of the first demultiplexer 124 and through the optical fiber cable (Step S602).

When the first photoelectric converter 130A of the first optical module 126A receives the optical signal having the wavelength $\lambda A$, the first signal processor 206 of the first optical module 126A calculates the wavelength to be set based on the wavelength information included in the received optical signal (Step S604). Specifically, the wavelength $\lambda A'$ is acquired by calculating the wavelength to be set based on the wavelength information indicated in Step S506 and the table stored in the storage 216.

Subsequently, the first optical module 126A sets the wavelength of the optical signal to be transmitted by the first optical transmitter 128A, and transmits the optical signal having the wavelength $\lambda A'$ (Step S606). Specifically, the first signal processor 206 of the first optical module 126A controls the wavelength variable light source 222 to output the wavelength of $\lambda A'$ acquired through calculation. Then, the first optical transmitter 128A of the first optical module 126A transmits an optical signal having the wavelength of $\lambda A'$. The wavelength information is not superimposed on the optical signal.

The transmitted optical signal is input to the input terminal A of the first multiplexer 122 through the optical fiber cable. The input optical signal is multiplexed by the first multiplexer 122 to become an optical multiplex signal, and is then output from the output terminal D of the first multiplexer 122. The optical multiplex signal is input to the second demultiplexer 144 through the optical fiber cable and through the input terminal D of the second demultiplexer 144. The optical multiplex signal is demultiplexed by the second demultiplexer 144, and the optical signal having the wavelength $\lambda A'$ is acquired through the demultiplexing. Then, the optical signal having the wavelength $\lambda A'$, which has been acquired through the demultiplexing, is input to the second photoelectric converter 150A of the second optical module 146A through the output terminal A of the second demultiplexer 144 and through the optical fiber cable (Step S508).

When the second photoelectric converter 150A of the second optical module 146A receives the optical signal, the second signal processor 208 of the second optical module 146A causes the second optical transmitter 148A to stop transmitting the optical signal including the wavelength information (Step S510). After that, the second optical transmitter 148A transmits a freely-set optical signal having the wavelength $\lambda A$. That is, the optical communication system shifts to the normal operation mode to start communication between the first optical module 126A and the second optical module 146A (Step S512).

Through the above-mentioned steps, the second signal processor 208 causes the second optical transmitter 148 to transmit an optical signal including wavelength information at the first frequency with a wavelength indicated by the wavelength information under the state before the second photoelectric converter 150 receives an optical signal. In addition, when the second photoelectric converter 150 receives an optical signal through a path that allows only the optical signal having the wavelength corresponding to the wavelength information to pass therethrough, the second signal processor 208 causes the second optical transmitter 148 to stop transmitting the optical signal including the wavelength information, and to transmit an optical signal having the wavelength indicated by the wavelength information and including communication data at the second frequency.

In this manner, the first optical module 126 can be installed without setting the wavelength of the optical signal to be transmitted by the first optical module 126A to the wavelength λA' determined in advance. Therefore, it is possible to reduce an initial time period required for setting a wavelength and a cost for wavelength setting work.

It is also possible to prevent communication from failing due to the installation of the first optical module 126 in which an erroneous wavelength is set.

In addition, the same setting is performed on the first optical module 126B and the first optical module 126C, and thus the wavelengths to be transmitted can be automatically set in all the first optical modules 126 included in the optical communication system 100. That is, it is not required to set the wavelengths in advance for all the first optical modules 126 included in the user-side system 120, which greatly reduces the amount of work for setting the wavelengths (for constructing the optical communication system 100).

Moreover, the first implementation does not require additional circuits and devices, and therefore enables cost reduction. For example, as long as the reception light intensity calculator 212 is provided in order to monitor the average intensity of the optical signal, it is not required to provide another reception light intensity calculator 212 required for acquiring wavelength information from the optical signal whose intensity changes at the first frequency. In addition, the wavelength setting mode and the normal operation mode are implemented by simply being set by, for example, firmware of each of the signal processors 206 and 208, and hence it is not required to add new hardware.

Further, the change in light intensity in the wavelength setting mode does not require strict synchronization unlike in the case of high-frequency data communication. Therefore, the optical signal whose intensity changes at the first frequency can be detected by each of the signal processors 206 and 208 operating at a low frequency.

In the first implementation, the second optical transmitter 148 of the second optical module 146 is not required to include the wavelength variable light source 222, and may include a fixed wavelength light source capable of outputting the wavelength λA.

Further, in the above-mentioned method, the second optical module 146 of the center-side system 140 transmits an optical signal on which the wavelength information is superimposed to set the wavelength of the optical signal to be transmitted by the first optical module 126 of the user-side system 120, which may be the other way around. That is, the first optical module 126 of the user-side system 120 may transmit an optical signal on which the wavelength information is superimposed to set the wavelength of the optical signal to be transmitted by the second optical module 146 of the center-side system 140.

Further, in FIG. 1, one optical fiber cable for transmission and one optical fiber cable for reception are illustrated between the center-side system 140 and the user-side system 120, but the same effect can be produced when single fiber bidirectional (BiDi) communication is employed with a single optical fiber cable that combines the optical fiber cable for transmission and the optical fiber cable for reception. In this case, the first multiplexer 122 and the first demultiplexer 124 may be integrally formed as a multiplexer/demultiplexer configured to perform both multiplexing and demultiplexing. In the same manner, the second multiplexer 142 and the second demultiplexer 144 may be integrally formed as a multiplexer/demultiplexer configured to perform both multiplexing and demultiplexing.

Further, when the multiplexer and the demultiplexer are not integrally formed, the wavelength λA and the wavelength λA' may be the same. In the same manner, the wavelength λB and the wavelength λB' may be the same, and the wavelength λC and the wavelength λC' may be the same.

According to a second implementations, when each of the photoelectric converters 130 and 150 is receiving no optical signal, each of the signal processors 206 and 208 causes each of the optical transmitters 128 and 148 to sequentially transmit an optical signal including wavelength information on another wavelength at the second frequency with the another wavelength. That is, the wavelength of the optical signal to be transmitted by the second optical module 146A is automatically set to λA, and the wavelength of the optical signal to be transmitted by the first optical module 126A is automatically set to λA'. Descriptions of the same operations and the same components as those in the first implementation are omitted below.

Figure 7:
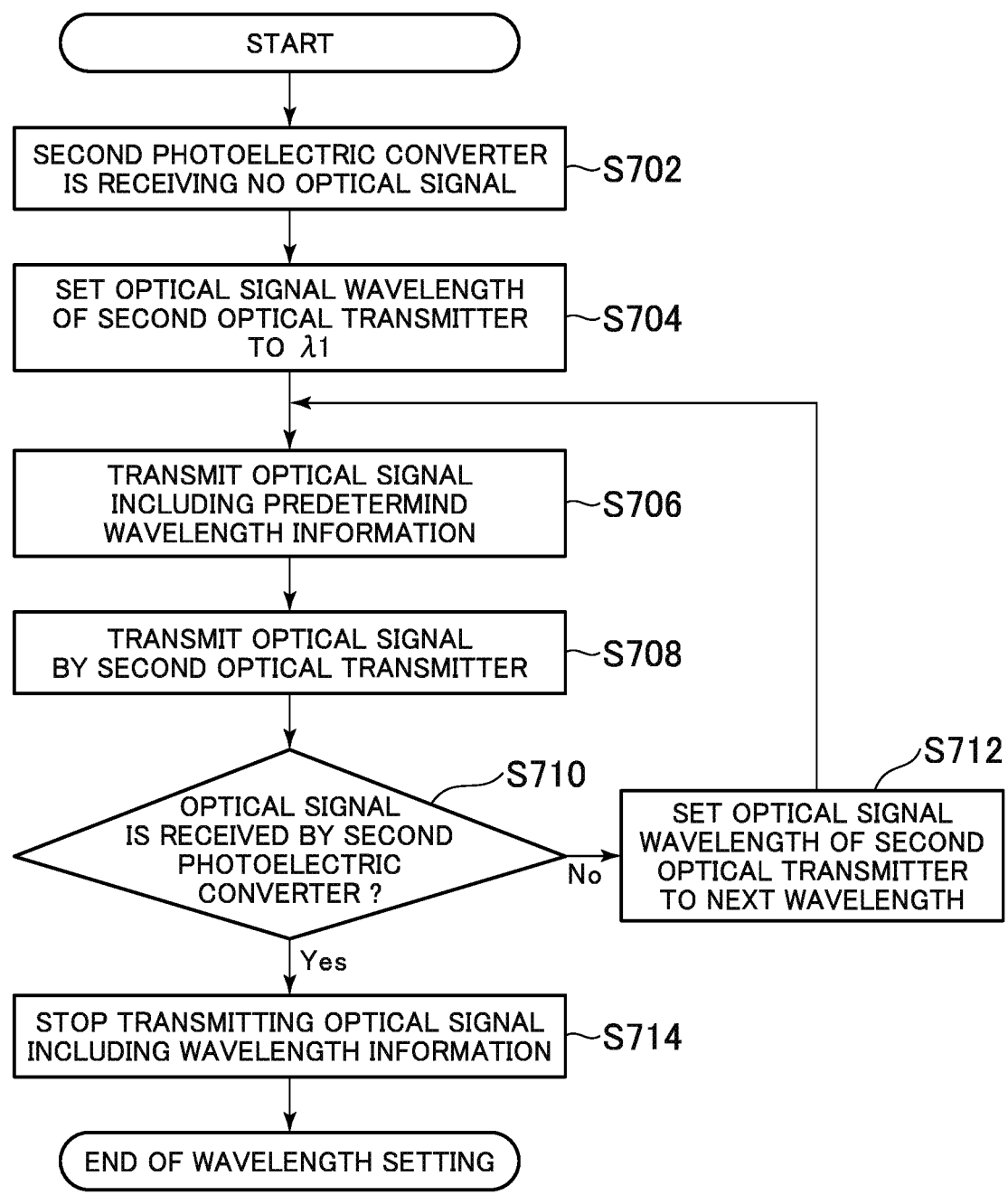
FIG. 7 is an example of a flow chart for illustrating an operation performed by a second optical module.
Figure 8:
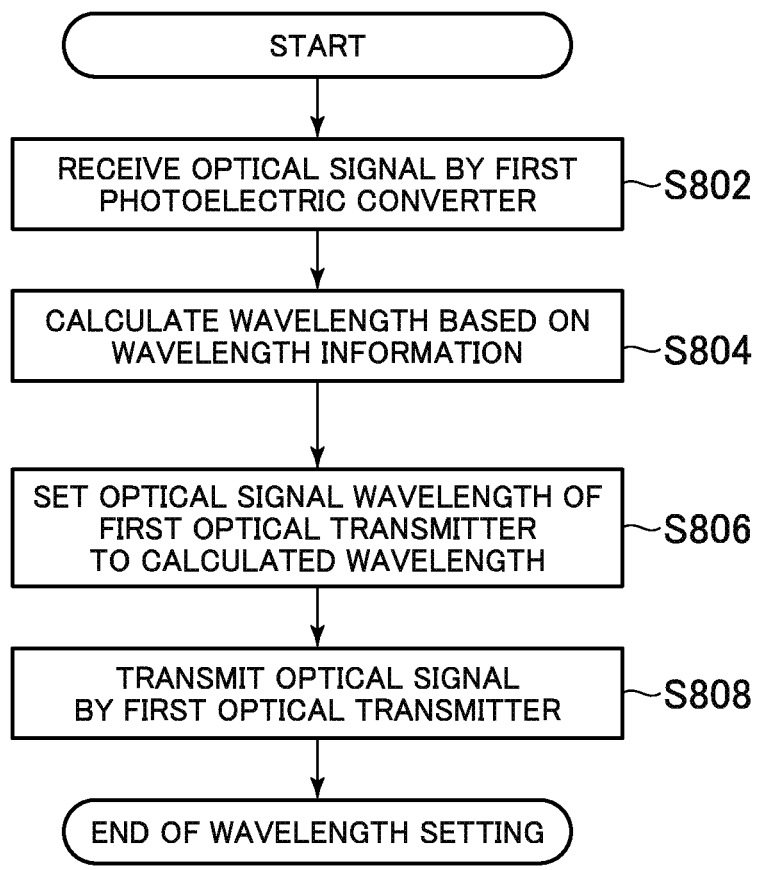
FIG. 8 is an example of a flow chart for illustrating an operation performed by a first optical module.

FIG. 7 is a flow chart for illustrating an operation performed by the second optical module 146A according to the second implementation. FIG. 8 is a flow chart for illustrating an operation performed by the first optical module 126A according to the second implementation. FIG. 9 is an example of combinations of wavelengths of the optical signals to be transmitted by the second optical module 146A included in the center-side system 140 and the first optical module 126A included in the user-side system 120. As shown in FIG. 9, the wavelengths of the optical signals to be transmitted by the first optical module 126A and the second optical module 146A, which are to be combined with each other, have a one-to-one correspondence relationship. The table shown in FIG. 9 is stored in the storage 216 in advance.

As an initial state, both the second photoelectric converter 150A of the second optical module 146A and the first photoelectric converter 130A of the first optical module 126A are receiving no optical signal. This initial state is also a state in which the wavelength of the optical signal to be transmitted by the second optical transmitter 148A of the second optical module 146A is not set to λA and the wavelength of the optical signal to be transmitted by the first optical transmitter 128A of the first optical module 126A is not set to λA' as well.

In the initial state, the mode is set to the wavelength setting mode in which communication has not been established. Therefore, the second photoelectric converter 150A of the second optical module 146A is receiving no optical signal (Step S702).

Subsequently, the second optical module 146A sets the wavelength of the optical signal to be transmitted by the second optical transmitter 148A to λ1 (Step S704). Then, the second signal processor 208 of the second optical module 146A refers to the table shown in FIG. 9 to control the output light intensity setting unit 220 so that the optical signal to be transmitted indicates desired wavelength information (Step S706). In this case, the desired wavelength is the wavelength λ1 corresponding to the wavelength λ1 of the optical signal to be transmitted by the second optical transmitter 148A.

Thus, the second optical transmitter 148A of the second optical module 146A transmits the optical signal having the wavelength λ1 and including the wavelength information on λ1 (Step S708).

In this case, the input terminal A of the second multiplexer 142 allows only the optical signal having the wavelength λA to pass therethrough. Therefore, the optical signal having the wavelength λ1 transmitted by the second optical transmitter 148A of the second optical module 146A does not pass through the input terminal A. Therefore, the second photoelectric converter 150A of the second optical module 146A receives no optical signal.

In addition, as described above, the wavelength of the optical signal to be transmitted by the first optical transmitter 128A of the first optical module 126A is not set to λA' in the initial state. Therefore, the optical signal transmitted by the first optical transmitter 128A of the first optical module 126A does not pass through the input terminal A of the first multiplexer 122 as well. Therefore, the second photoelectric converter 150A of the first optical module 126A also receives no optical signal.

Subsequently, after a predetermined time period (for example, a time period required for switching the wavelength of the optical module, which is several seconds) has elapsed since the transmission of the optical signal including the wavelength information indicating λ1, when the second photoelectric converter 150A of the second optical module 146A has not received the optical signal (No in Step S710), the second optical module 146 sets the wavelength of the optical signal to be transmitted by the second optical transmitter 148A to λ2 (Step S712).

In addition, the second signal processor 208 of the second optical module 146A refers to the table shown in FIG. 9 to perform control so that the optical signal to be transmitted by the second optical transmitter 148A includes the wavelength information on the wavelength λ2' corresponding to the wavelength λ2 of the optical signal to be transmitted by the second optical transmitter 148A (Step S706).

Thus, the second optical transmitter 148A of the second optical module 146A transmits the optical signal having the wavelength λ2 and including the wavelength information on λ2' (Step S708).

In this manner, the second optical transmitter 148A of the second optical module 146A transmits the optical signal while switching a pair of the wavelength of the optical signal to be transmitted by the second optical transmitter 148A and the included wavelength information to another pair every predetermined time period. That is, the second signal processor 208 causes the second optical transmitter 148A to sequentially transmit an optical signal including wavelength information on another wavelength at the second frequency with the another wavelength. The processing steps from Step S706 to Step S712 is repeatedly executed until the second photoelectric converter 150A of the second optical module 146A receives the optical signal.

After the predetermined time has elapsed, the wavelength of the optical signal to be transmitted by the second optical transmitter 148A of the second optical module 146A is set to λA (Step S712).

The second signal processor 208 of the second optical module 146A refers to the table shown in FIG. 9 to perform control so that the wavelength information on the wavelength λA' corresponding to the wavelength λA of the optical signal to be transmitted by the second optical transmitter 148A is included in the optical signal to be transmitted by the second optical transmitter 148A (Step S706).

Thus, the second optical transmitter 148A of the second optical module 146A transmits the optical signal having the wavelength λA and including the wavelength information on λA' (Step S708).

In this case, the input terminal A of the second multiplexer 142 allows only the optical signal having the wavelength λA to pass therethrough. Therefore, the optical signal having the wavelength λA is received by the first photoelectric converter 130A of the first optical module 126A through the same path as in the first implementation (Step S802).

When the first photoelectric converter 130A of the first optical module 126A receives the optical signal having the wavelength λA, the first signal processor 206 of the first optical module 126A calculates the wavelength to be set based on the wavelength information included in the received optical signal (Step S804). Specifically, the first signal processor 206 acquires the wavelength λA' by calculating the wavelength to be set based on the wavelength information indicated in Step S706 and the table stored in the storage 216.

Subsequently, the first signal processor 206 of the first optical module 126A controls the wavelength variable light source 222 to output the wavelength of λA' acquired through calculation. Thus, the first optical module 126A sets the wavelength of the optical signal to be transmitted by the first optical transmitter 128A to λA' (Step S806). Then, the first optical transmitter 128A of the first optical module 126A transmits an optical signal having the wavelength of λA' (Step S808). The wavelength information is not superimposed on the optical signal.

The optical signal having the wavelength of λA' transmitted in Step S808 is input to the second photoelectric converter 150A of the second optical module 146A through the same path as in the first implementation (Yes in Step S710).

When the second photoelectric converter 150A receives the optical signal within a predetermined time period after the second optical transmitter 148A of the second optical module 146A transmits the optical signal having the wavelength λA, the second signal processor 208 of the second optical module 146A causes the second optical transmitter 148A to stop transmitting the optical signal including the wavelength information (Step S714).

As described above, the wavelength of the optical signal to be transmitted by the second optical transmitter 148A of the second optical module 146A is set to λA, and the wavelength of the optical signal to be transmitted by the first optical transmitter 128A of the first optical module 126A is set to λA'. With this setting, communication is established, and the mode shifts to the normal operation mode. Then, any data communication becomes ready.

In the first implementation, it is assumed that the wavelength of the optical signal to be transmitted by the second optical transmitter 148A of the second optical module 146A is set to λA in advance, or that the wavelength of the optical signal to be transmitted by the first optical transmitter 128A of the first optical module 126A is set to λA' in advance. However, according to the second implementation, it is not required to set any one of the wavelengths of the optical signals to be transmitted by the second optical transmitter 148A of the second optical module 146A and the first optical transmitter 128A of the first optical module 126A. Therefore, the cost required for wavelength setting can be reduced.

In the same manner as in the first implementation, it is possible to prevent communication from failing due to the installation of the first optical module 126 or the second optical module 146 in which an erroneous wavelength is set.

The same setting is performed on the first optical module 126B, the first optical module 126C, the second optical module 146B, and the second optical module 146C, and thus the wavelengths to be transmitted can be automatically set in all the first optical modules 126 and all the second optical modules 146 included in the optical communication system 100. That is, it is not required to set the wavelengths in advance for all the first optical modules 126 and all the second optical modules 146 included in the center-side system 140 and the user-side system 120, which greatly reduces the amount of work for setting the wavelengths (for constructing the optical communication system 100).

In the same manner as in the first implementation, in the second implementation, the first optical module 126 included in the user-side system 120 may transmit an optical signal on which the wavelength information is superimposed to set the wavelength of the optical signal to be transmitted by the second optical module 146 included in the center-side system 140.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical module comprising:
a photoelectric converter configured to:
receive an optical signal having an intensity that changes at one of a first frequency or a second frequency that is higher than the first frequency, and convert the optical signal into a current signal corresponding to the intensity of the optical signal;
a signal processor configured to:
acquire, when the optical signal has the intensity that changes at the first frequency, wavelength information set on a transmitting side based on a ratio between a plurality of signal intensities included in the current signal relating to the optical signal having the intensity that changes at the first frequency; and
a decoder configured to:
generate, when the optical signal has the intensity that changes at the second frequency, communication data from the current signal relating to the optical signal having the intensity that changes at the second frequency.

2. The optical module of claim 1, further comprising:
an optical transmitter configured to transmit an optical signal having a wavelength corresponding to wavelength information based on the wavelength information acquired by the signal processor.

3. The optical module of claim 1,
wherein the current signal relating to the optical signal having the intensity that changes at the first frequency includes signal intensities having at least ternary values, and
wherein the signal processor is configured to acquire the wavelength information based on the ratio between the signal intensities having at least ternary values.

4. The optical module of claim 1, wherein the optical module is configured to start to extract the communication data from the current signal relating to the optical signal having the intensity that changes at the second frequency when the wavelength information is acquired based on the ratio between the plurality of signal intensities.

5. The optical module of claim 1, wherein the first frequency is from 1 Hz to 250 Hz.

6. The optical module of claim 1, wherein the second frequency is 1 GHz or higher.

7. The optical module of claim 1, wherein:
the optical signal having the intensity that changes at the first frequency is used during a wavelength setting mode, and
the optical signal having the intensity that changes at the second frequency is used during an operation mode.

8. An optical module comprising:
a photoelectric converter configured to output a current signal corresponding to an intensity of a first optical signal;
an optical transmitter configured to transmit a second optical signal having an intensity that changes at one of a first frequency or a second frequency higher than the first frequency; and
a signal processor configured to:
cause, under a state before the photoelectric converter receives the first optical signal, the optical transmitter to transmit the second optical signal including wavelength information at the first frequency with a wavelength indicated by the wavelength information;
cause, when the photoelectric converter receives the first optical signal through a path that allows only an optical signal having the wavelength corresponding to the wavelength information to pass therethrough, the optical transmitter to stop transmitting the second optical signal including the wavelength information; and
transmit the second optical signal having the wavelength indicated by the wavelength information and including communication data at the second frequency.

9. The optical module of claim 8, further comprising:
storage configured to store information indicating a ratio between a plurality of signal intensities included in the current signal relating to the second optical signal having the intensity that changes at the first frequency and the wavelength information in association with each another.

10. The optical module of claim 9, wherein the signal processor is further configured to cause, under the state before the photoelectric converter receives the first optical signal, the optical transmitter to transmit the second optical signal based on the ratio.

11. The optical module of claim 8, wherein the signal processor is further configured to cause, when the photoelectric converter receives no optical signal, the optical transmitter to sequentially transmit the second optical signal on another wavelength at the second frequency.

12. The optical module of claim 8, wherein the first frequency is from 1 Hz to 250 Hz.

13. The optical module of claim 8, wherein the second frequency is 1 GHz or higher.

14. The optical module of claim 8,
wherein the current signal includes signal intensities having at least ternary values, and
wherein the signal processor is configured to acquire the wavelength information based on a ratio between the signal intensities having at least ternary values.

15. The optical module of claim 8, wherein
the second optical signal having the intensity that changes at the first frequency is used during a wavelength setting mode, and
the second optical signal having the intensity that changes at the second frequency is used during an operation mode.

16. An optical communication system comprising:
a first optical module comprising:
a photoelectric converter configured to receive a first optical signal having an intensity that changes at one of a first frequency or a second frequency higher than the first frequency and convert the first optical signal into a current signal corresponding to the intensity of the first optical signal;
a first signal processor configured to acquire, when the first optical signal has the intensity that changes at the first frequency, wavelength information set on a transmitting side based on a ratio between a plurality of signal intensities included in the current signal relating to the first optical signal having the intensity that changes at the first frequency; and
a first optical transmitter configured to transmit a second optical signal having a wavelength corresponding to the wavelength information based on the wavelength information acquired by the first signal processor; and
a second optical module comprising:
a second photoelectric converter configured to output a current signal indicating a change in intensity of a third optical signal;
a second optical transmitter configured to transmit a fourth optical signal having an intensity that changes at one of the first frequency and the second frequency; and
a second signal processor configured to:
cause, under a state before the second photoelectric converter receives the third optical signal, the second optical transmitter to transmit the fourth optical signal including the wavelength information at the first frequency with the wavelength indicated by the wavelength information; and
cause, when the second photoelectric converter receives the third optical signal through a path that allows only an optical signal having the wavelength corresponding to the wavelength information to pass therethrough, the second optical transmitter to stop transmitting the fourth optical signal including the wavelength information and transmit a fifth optical signal having the wavelength indicated by the wavelength information and including communication data at the second frequency.

17. The optical communication system of claim 16, further comprising:
a multiplexer including:
a plurality of input terminals, to which optical signals having mutually different wavelengths are to be input; and
an output terminal, from which an optical multiplex signal obtained by multiplexing a plurality of optical signals having mutually different wavelengths is to be output.

18. The optical communication system of claim 17, further comprising:
a demultiplexer including:
an input terminal to which the optical multiplex signal is to be input; and
a plurality of output terminals, from which optical signals having mutually different wavelengths included in the optical multiplex signal are to be output,
wherein the first optical transmitter is coupled to one of the plurality of input terminals included in the multiplexer, and
wherein the second photoelectric converter is coupled to one of the plurality of output terminals included in the demultiplexer.

19. The optical communication system of claim 16, wherein:
the first frequency is from 1 Hz to 250 Hz, and
the second frequency is 1 GHz or higher.

20. The optical communication system of claim 16, wherein:
the first optical signal having the intensity that changes at the first frequency is used during a wavelength setting mode, and
the first optical signal having the intensity that changes at the second frequency is used during an operation mode.

* * * * *